US008618427B2

(12) United States Patent
Brendel et al.

(10) Patent No.: US 8,618,427 B2

(45) Date of Patent: Dec. 31, 2013

(54) SPHERICAL CAP FOR HIGH-VOLTAGE OUTGOING LINES IN OIL TRANSFORMERS

(75) Inventors: Hartmut Brendel, Halle (DE); Matthias Starke, Kabelsketal (DE); Ralf Büchner, Halle (DE); Jelena Braatz, WeiBenfels (DE); Klaus Herkert, Mudau (DE)

(73) Assignee: ABB Technology AG, Zurich (CH)

( * ) Notice: Subject to any disclaimer, the term of this patent is extended or adjusted under 35 U.S.C. 154(b) by 217 days.

(21) Appl. No.: 13/273,865

(22) Filed: Oct. 14, 2011

(65) Prior Publication Data

US 2012/0090889 A1 Apr. 19, 2012

(30) Foreign Application Priority Data

Oct. 15, 2010 (EP) .................................... 10187700

(51) Int. Cl.
*H02G 3/18* (2006.01)

(52) U.S. Cl.
USPC ......................................... 174/659; 174/73 A

(58) Field of Classification Search
USPC ................................................ 174/74 A, 659
See application file for complete search history.

(56) References Cited

U.S. PATENT DOCUMENTS 3,806,625 A * 4/1974 Long ........................... 174/31 R
5,550,724 A * 8/1996 Moulton ....................... 362/267

FOREIGN PATENT DOCUMENTS

CH 695 968 A5 10/2006

OTHER PUBLICATIONS

For the Examiner's convenience: Office Action issued by the U.S. Patent and Trademark Office in the U.S. Appl. No. 13/273,941, mailed Apr. 8, 2013, U.S. Patent and Trademark Office, Alexandria, VA. (12 pages).

* cited by examiner

*Primary Examiner* — Dhirubhai R Patel
(74) *Attorney, Agent, or Firm* — Buchanan Ingersoll & Rooney PC

(57) ABSTRACT

The disclosure relates to a spherical cap for a high-voltage outgoing line, including an electrically conductive element, which is arranged hollow-cylindrically about a rotational axis and which merges into a hemispherical form at its first axial end. A connection device has a passage opening for electrically and mechanically connecting the element, to an electrical screening pipe. At least two insulation barriers are spaced apart from one another and respectively adapted to the form of the hollow-cylindrical element and enclose the latter at a respective first and second distance. The insulation barriers respectively have a pipe attachment connector for leading through a screening pipe to the connection device. The connection device has a first part for connection to a screening pipe and a second part connected to the conductive element and a connection adjustable in a force-locking manner is provided between the first and second parts.

19 Claims, 5 Drawing Sheets

SPHERICAL CAP FOR HIGH-VOLTAGE OUTGOING LINES IN OIL TRANSFORMERS

RELATED APPLICATION(S)

This application claims priority under 35 U.S.C. §119 to European Patent Application No. 10187700.9 filed in Europe on Oct. 15, 2010, the entire content of which is hereby incorporated by reference in its entirety.

FIELD

The disclosure relates to a spherical cap for a high-voltage outgoing line, including an electrically conductive element, which is arranged as a hollow cylinder about a rotational axis that merges into a hemispherical form at its first axial end. A connection device has a passage opening and serves to electrically and mechanically connect the element to an electrical screening pipe. At least two insulation barriers are spaced apart from one another and are respectively adapted to the form of the hollow-cylindrical element and enclose the latter at a respective first and second distance. The insulation barriers, respectively, have a pipe attachment connector for leading through a screening pipe to the connection device.

BACKGROUND INFORMATION

Known high-voltage transformers or high-voltage inductors, for example, having a rated voltage on the high-voltage side of 220 kV or 380 kV and a rated power of >100 MVA, for insulation and cooling purposes, can be arranged in an oil-filled transformer tank. A so-called transformer bushing has a useful function in a transformer of this type. A high-voltage potential is led through the bushing from an air side to a winding in the transformer tank. In the case of pure air insulation, the distance between components at high-voltage potential and the earthed transformer tank—depending on the voltage level—can be up to 4 m or more. By an oil-impregnated paper or cellulose, which can withstand a higher field stress than air, the distance can be decreased. If a high-voltage connection is led into the tank concentrically through a round opening, then a distance between an internal conductor and a tank of 20 cm, for example, can suffice.

Known spherical caps are used for this purpose in the region of the outgoing lines. These are rotationally symmetrical hollow bodies composed of a metal which have a hemisphere-like termination with a usually angled pipe attachment for a conductor connection or a conductor bushing at one axial end and a tapering diameter at their other axial end. For improved insulation, these electrically conductive hollow bodies can be surrounded with a double-walled barrier system composed of an insulation material, which is likewise arranged within the oil-filled transformer tank.

CH 695 968 A5 describes a spherical cap of this type, but has a disadvantage that the insulation barriers can be laborious to manufacture, and has an insulation capability that is able to be improved.

For example, the insulation barriers are spaced apart by insulation rings into which spacer blocks are latched. This is laborious to manufacture and also not optimal in terms of insulation technology because components having sharp edges at points are used within a region that exhibits a voltage gradient and is to be electrically insulated. The use of spacer blocks can be disadvantageous particularly in the hemisphere-like regions of the barriers because there is a particularly high risk of the insulation barrier that is to be spaced apart bearing merely on corner points of the spacer blocks.

The possibility of electrical connection of the spherical cap to a screening pipe can prove to be disadvantageous. This is because high-voltage outgoing lines can be individually manufactured items which are subject both to their own manufacturing tolerances and to the manufacturing tolerances of an oil transformer upon installation into the latter. Compensation of such tolerances is either possible by a mechanically particularly pliable connection between the screening pipe and the spherical cap, which can be undesirable for stability reasons, or relatively high forces are applied permanently via the spherical cap, in order to fix the components in the desired position, which can likewise be undesirable.

SUMMARY

A spherical cap is disclosed for a high-voltage outgoing line, comprising: an electrically conductive element, which is arranged as a hollow-cylinder about a rotational axis that merges into a hemispherical form at its first axial end; a connection device having a passage opening for electrically and mechanically connecting the element to an electrical screening pipe; at least two insulation barriers spaced apart from one another, and respectively adapted to a form of the hollow-cylindrical element, for enclosing the hollow cylindrical element at respective first and second distances, the insulation barriers respectively having a pipe attachment connector for leading through the screening pipe to the connection device, wherein the connection device includes a first part for connection to the screening pipe, and a second part connected to the conductive element, wherein a connection, adjustable in a force-locking manner, is provided between the first and second parts.

BRIEF DESCRIPTION OF THE DRAWINGS

The disclosure, further embodiments and further advantages will be described in greater detail on the basis of the exemplary embodiments illustrated in the drawings, wherein.

DETAILED DESCRIPTION

Figure 1:
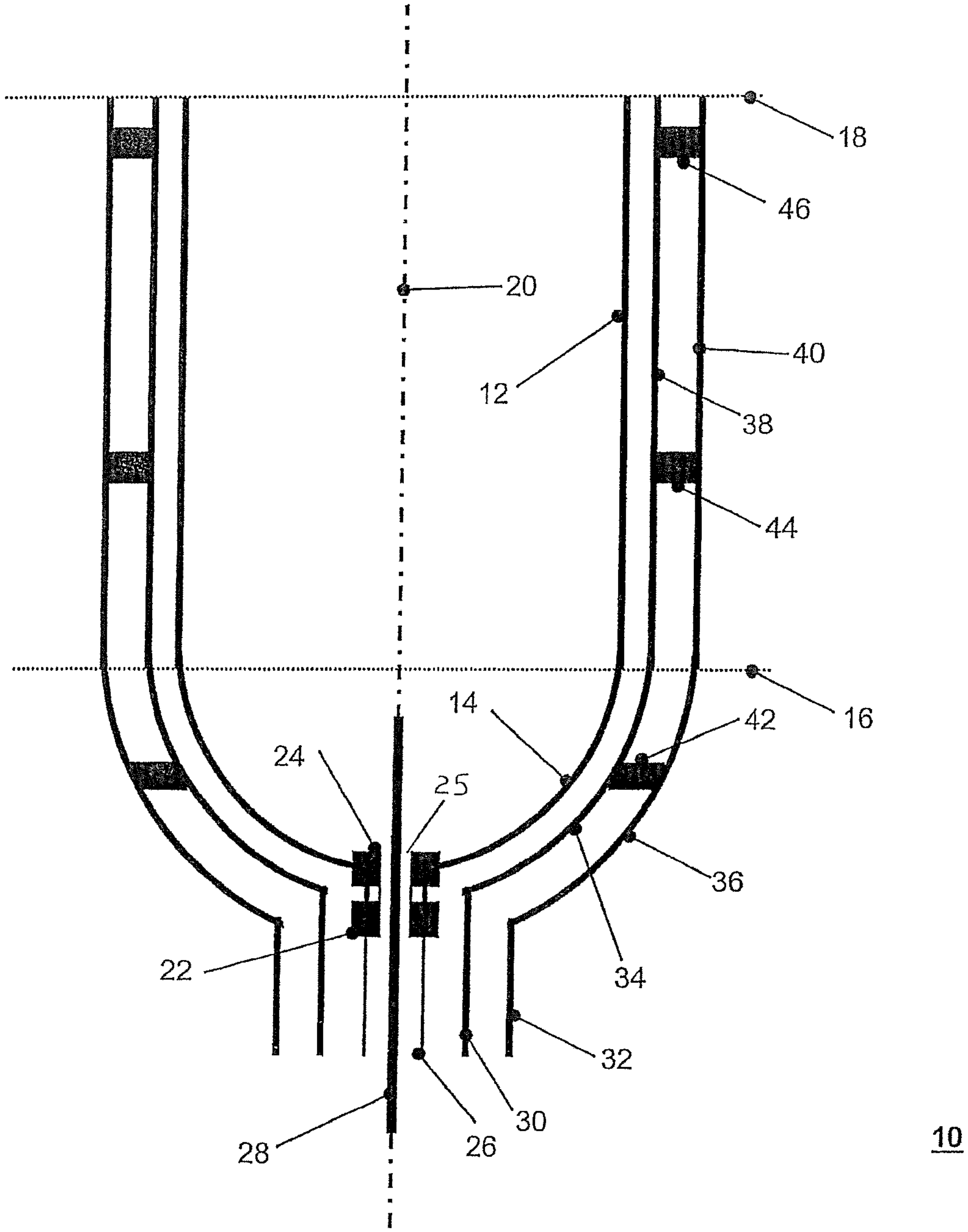
FIG. 1 shows a section through a first exemplary embodiment of a spherical cap.

A spherical cap for a high-voltage outgoing line according to an exemplary embodiment of the disclosure includes a connection device having a first part for connection to a screening pipe and a second part connected to the conductive element. A connection, adjustable in a force-locking manner, is provided between the first and second parts.

This can make it possible to adapt a position of the spherical cap on a screening pipe through which an electrical conductor is led from a transformer situated in an oil-filled tank to an outgoing line location on a tank wall. Consequently, tolerances in the arrangement of a screening pipe and manufacturing tolerances of an oil tank or of the spherical cap itself can be corrected to an extent. This extent can be determined from the angle adjustability of the connection device and can amount to a few degrees, for example, +/−3°. The connection device can be embodied in such a way that a conductor led through its passage opening can be screened toward the outside, for example by suitable screening plates which are also movable relative to one another, as desired, during adjustment.

In an exemplary embodiment of the spherical cap, the connection adjustable in a force-locking manner has two groups of, in each case, three parallel aligned screw connections arranged in triangles respectively offset relative to one another. The first group can be provided for applying a tensile force between the two parts, and the second group for applying a compressive force between the two parts.

An area in space can be defined by three points, whereby, by the first group of screw connections, by the respective length thereof, an area can be defined in spatial relation to the first part of the connection device. The first part, in turn, can be provided for being connected to a screening pipe. The second group of screw connections defines, by the respective length thereof, an area in spatial relation to the second part of the connection device, wherein the second part, in turn, can be connected to the conductive element. By providing one group of screw connections for exerting a tensile force and the other group for exerting a compressive force, the two parts of the connection device can be adjusted well with respect to one another and fixed. Thus, in an adjustment process, for example, first the screw connections provided for exerting a compressive force can be adjusted to the respectively desired length. This is then followed by fixing in the desired position by tightening the screw connections provided for applying a tensile force.

Because the three screw connections are provided in each case, each plane can be precisely determined by the length thereof, such that a possibly bistable state, such as might occur, for example, given four or five screw connections per group, can be avoided. In the case of a screw connection designed for tensile force, by way of example, a screw or threaded rod extends through a threadless passage hole in the first part of the connection device into a thread in the second part. Correspondingly, in the case of a screw connection designed for compressive force, a screw extends through a matching continuous thread course in the first part of the connection device and then impinges on the surface of the second part of the connection device, without a thread course or the like being provided there. For the functioning of such a connection device, it is unimportant whether compressive or tensile force connections are arranged in the first or second part or whether a screw connection or some other length-adjustable component is actually involved. Instead of a threadless passage hole through which a screw having a thread is inserted, a passage hole having a thread is also conceivable, through which can be inserted a screw having no thread in a desired region. What is desirable here is that the connection is displaceable in a specific region without rotary movement along the screw.

The screw connections of at least one of the groups can be arranged equidistantly along a common circular path around the passage opening of the connection device. This can afford geometrical advantages because the passage opening then constitutes a fictitious tilting point of the two connection device parts with respect to one another and this also constitutes precisely the desired tilting point for a conductor connection of a transformer which is usually carried out there.

All the screw connections of the two groups can be accessible through a tapered second axial end of the conductive element. Upon subsequent installation of the spherical cap into an oil transformer, the screw connections can then be accessible with their screw heads through the openings provided for the outgoing line in the transformer tank, whereas accessibility from the opposite side is not provided.

In accordance with an exemplary embodiment of the spherical cap, the second part of the connection device can be milled and welded into the conductive element. This can then enable a modular system in a simple manner, as a result of which a multiplicity of different variants can be generated with a small number of basic components or basic forms.

In accordance with an exemplary embodiment of the disclosure, a torus-like milled electrode having a drop-like cross-section widening towards the axial end can be welded onto the tapering second axial end of the conductive element. In this case, the advantage of a modular system can be afforded, and an improved electrical behaviour can be achieved because the second axial end region—desirable for a maximum field strength—of the spherical cap, now has no sharp edges of a bending process. The drop form can be configured in such a way that, within the spherical cap, no cavities arise in which air bubbles that could impair the insulation capability could collect during the process of filling the relevant transformer tank with oil. This can depend on the arrangement of the spherical cap within the transformer tank, which can be substantially perpendicular. A suitable drop form can have, for example, an angle of approximately 20° to 40° (or lesser or greater) of the lower edge of the drop form with respect to a plane perpendicular to the rotational axis, which accordingly enables an inclination of the spherical cap in a range of somewhat below 20° to 40° (or lesser or greater).

In accordance with an exemplary embodiment of the disclosure, the conductive element, at least one part of the connection device and/or the electrode are/can be produced from aluminium. Aluminium affords a series of advantages, for example, low weight, simple processing, good durability and conductivity.

According to an exemplary embodiment of the disclosure, in an configurational form of the spherical cap, it is provided that the connection device is connected to the conductive element in the region of the hemispherical first end thereof, and in that a screening pipe can be led through the passage opening of the connection device and through an opening adjacent in the wall of the conductive element into the interior thereof. This can enable good screening of an electrical conductor by the screening pipe as far as directly into the interior of the electrically conductive element, wherein here the connection device can be adjusted without the screening being impaired. However, in alternate exemplary embodiments, the parts of the connection device overlay and fulfill a screening function in such a way that it is not necessary to guide a screening pipe through the connection device.

A spherical cap according to an exemplary embodiment of the disclosure includes a first insulation barrier spaced apart from a second insulation barrier by at least one insulation ring which is arranged about a rotational axis and which has a radially fashioned, for example, flattened, corrugated form.

This can provide advantages in terms of production technology because an elasticity of the insulation ring can be achieved by the corrugated form. The internal diameter of the elastic insulation ring can be adapted to the external diameter of the first insulation barrier, which is subject to certain fluctuations in a manner governed by production. By applying a slight force along the rotational axis, it is therefore possible to push such an insulation ring over the cylindrical region of the first insulation barrier. Once the insulation ring has attained the desired position after the pushing operation, it can clamp fixedly there on account of its elasticity and further fixing, for example, using an adhesive is advantageously obviated or reduced to a few points. Of course, these elasticity-governed advantages are also afforded when pushing—in a manner governed by production technology—the second insulation barrier over the insulation rings fixedly clamped on the first insulation barrier. An exemplary diameter of such an insulation ring can be, for example, 30 cm to 40 cm (or lesser or greater), wherein such an insulation ring can be provided as desired every approximately 10 cm to 25 cm (or lesser or greater) of axial length, for example. The radial thickness of such an insulation ring can be, for example, a few centimeters.

In addition, advantages in terms of insulation technology can also be afforded. Regions having sharp edges can be avoided by virtue of the corrugated form of the insulation ring. Rather than the insulation barriers being spaced apart continuously in a manner running purely in a radial direction, the radial, that is to say the shortest, insulation path always has a portion through the material of the insulation ring, for example, pressboard, and a portion through oil, with which the interior of the spherical cap can be filled in the operating state, which has a positive effect on the insulation capacity. In the case where they are spaced apart only by solid insulation material continuously in a manner running in the radial direction, the electric field is displaced by the higher permittivity of the material into the adjoining oil paths, which have less electric strength and which are thereby subjected to higher electrical loading. Moreover, the corrugated form can increase the creepage path and thus can also increase the insulation capability of the overall arrangement.

The insulation path running purely through the material of the insulation ring can have a tangential transverse component and is therefore longer than the purely radial component. As a result of the flattened corrugated form which in each case can follow the circular structure of the ring, moreover, at the flattened portions, a punctiform mechanical contact-connection between the insulation ring and the respectively adjoining insulation barrier can be avoided and can be replaced by an areal contact-connection. As a result of the flattening of the corrugated form, the number of corrugation troughs lying radially on the inside and corrugation peaks lying radially on the outside and also, for example, the number of cross-connections between them, can be reduced. The insulation capability between first and second barriers can be increased by the aspects mentioned above.

In one exemplary embodiment of the spherical cap according to the disclosure, the insulation ring, in the region of the hemispherical form of the conductive element, can be adapted radially on the inside and radially on the outside to the respective enclosing hemispherical form of the respectively adjoining insulation barriers. This can ensure that a flattened corrugation peak and a flattened corrugation trough, also in the region of the hemispherical form of the adjoining insulation barriers, can be mechanically contact-connected to the insulation barriers by the respectively spherically adapted flattened areas and a punctiform contact-connection can be avoided. The positioning of the insulation ring in the hemispherical region can likewise prove to be relatively simple and flexible because it is possible to implement a ring form in a hemispherical form of corresponding diameter in any desired multiplicity of angles, such that possible positioning tolerances can have no adverse influence.

In accordance with another exemplary embodiment of the disclosure, the conductive element can be tapered in the form of a hemispherical section at its second axial end. Accordingly, the insulation barriers surrounding this region at a respective distance likewise have a hemispherical-section-like form and the insulation rings having the spherically adapted flattened corrugation peaks and corrugation troughs can advantageously also be used there.

In accordance with another exemplary embodiment of the spherical cap according to the disclosure, the first insulation barrier can be spaced apart from the electrically conductive element by insulation strips which are flexible at least in sections. The insulation strips can be embodied as an angled profile and can be provided with a plurality of slots transversely relative to their respective axial extent at least in the flexible section.

This can afford advantages both in terms of production technology and in terms of insulation technology. A flexible strip, for example, having a width in a range of 2 cm to 4 cm (or lesser or greater) and a thickness in a range of 1 cm to 2 cm (or lesser or greater), which is manufactured from milled pressboard, for example, can be fitted, for example, as a component along the axial length of the conductive element. A plurality of such strips can be fitted along the circumference of the element, for example, equidistantly at a distance of 60°, for example. In an exemplary embodiment according to the disclosure strips may not be fitted directly on the conductive element. Rather the latter can also be covered by a layer of insulation material, on which the strips can then be adhesively bonded, for example.

The strips can also be arranged such that they can be subdivided and at other angles. The arrangement of the strips substantially parallel to the rotational axis can afford the advantage, however, particularly in combination with the insulation rings to be arranged thereabove and transversely with respect thereto, that the mechanical connection behaviour between insulation strip and insulation ring along the rotational axis, at least in the cylindrical region of the spherical cap, can be constant. The embodiment as a slotted strip can result in a high stability in the radial direction and a flexibility that is acquired, for example, in the region of the hemispherical form. The sharp-edged regions arising as a result of the slots are not disadvantageous for the insulation capacity insofar as they are arranged alongside one another at a small distance of a few millimetres and in this way nevertheless a homogeneity can also arise in the distribution of the electric field.

The angled profile of a flexible strip can be embodied as an X-, V- and/or Y-profile. This can afford the mechanical advantage that such a profile, at one cross-sectional end, can be placed with two bearing points or bearing lines particularly simply and stably onto the conductive element. The cross-sectional form of the strips in their mechanical contact regions or bearing areas lying radially on the inside and outside can also follow the circle radius of the conductive element or the insulation barrier. Here as well the effect occurs that purely radial spacing-apart by the insulation material is not effected and a tangential component is present, which can improve the insulation capacity in the space between the conductive element and the first insulation barrier. The space is oil-filled in the operating state, and the radial displacement of the electric field into the adjoining oil paths can be minimized.

In accordance with an exemplary embodiment of the disclosure, a pipe attachment connector of the first and/or second insulation barrier can be integrally formed directly onto the latter, such that a seam can be avoided. The insulation barriers can be produced with a corresponding metal mold around which, for example, a layer of wet and therefore flexible cellulose or pressboard can be arranged. This is hardened together with the metal mold in a furnace. The pipe attachment connector can be arranged in an angled fashion with respect to the rotational axis in the region of the hemispherical form, for example, at an angle of 0° to 30° (or lesser or greater), such that the mold is then configured for the insulation barrier in such a way that a first mold part having a cylindrical and hemispherical form is embodied such that it can be separated from a second mold part having a pipe attachment connector. Specifically, separation of the two mold parts can be desirable in order to be able to remove the metal mold again, after the hardening of the insulation barrier material, from the shaped part newly produced in this way. By virtue of the pipe attachment connector being integrally formed directly, the insulation capacity of the insulation barrier can be improved because adhesive bonding of a pipe attachment connector in accordance with the known arrangement can be avoided and the wall of the insulation barrier can be homogeneous. Given the presence of hemispherical or tapered regions at both axial ends of the conductive element or of the insulation barriers surrounding the latter, these, in a manner governed by production technology, can be manufactured from two half-shell-like modules which are then connected to one another at one axial end.

A spherical cap according to an exemplary embodiment of the disclosure, having a connection device having a first part for connection thereof to a screening pipe and a second part connected to the conductive element, can include a connection adjustable in a force-locking manner provided between the first and second parts. This can make it possible to adapt the position of the spherical cap on a screening pipe through which an electrical conductor is led from a transformer situated in the oil-filled tank to an outgoing line location on the tank wall. Consequently, tolerances in the arrangement of a screening pipe but also manufacturing tolerances of an oil tank or of the spherical cap itself can be corrected to an extent. This extent can be determined from the angle adjustability of the connection device and amounts to a few degrees, for example, +/−3°. The connection device can be embodied in such a way that a conductor led through its passage opening can be screened toward the outside, for example, by suitable screening plates which are also movable relative to one another, as desired, during adjustment.

FIG. 1 shows a section through an exemplary spherical cap 10. A cylindrical region 12 of a conductive element composed of a material similar to sheet metal, for example, having a wall thickness of 0.8 mm and a diameter of 40 cm, is arranged rotationally symmetrically about a rotational axis 20. The axial ends of the cylindrical region 12 are identified by the reference numerals 16 and 18. The first axial end 16 is adjoined by a hemispherical region 14 composed of the same material similar to sheet metal, wherein, in this case, cylindrical 12 and hemispherical 14 regions were manufactured together from a metal sheet and have no seam. The hemispherical region 14 of the conductive element is provided with a circular perforation in an axially outermost region, a second part 24 of an approximately rotationally symmetrical adjustable connection device being welded into the perforation. The connection device can be aligned on the hemispherical region 14 at an exemplary angle of about 0° to 30° with respect to the rotational axis 20; 0° is shown in the figure.

The second part 24 of the adjustable connection device, in the same way as the first 22 axially adjoining part thereof, has a disk-like hollow-cylindrical form having a thickness of several millimeters. A screening pipe 26 is mounted onto the first part 22 of the connection device by a screw/clamping connection. The screening pipe bears the weight of the spherical cap. Through a passage opening 25 in the connection device, for example, through the hollow-cylindrical inner region of the first 22 and second 24 parts, a high-voltage conductor 28 is led into the electrically screened interior of the spherical cap. In order to ensure reliable screening of the high-voltage conductor 28 for each adjustment position of the spherical cap by screw connections—indicated in the figure—which connect the first 22 and second 24 parts of the connection device to one another in a variable manner, the screening pipe 26 or an electrical equivalent can be led right into the interior of the spherical cap.

The conductive element 12,14 is surrounded by a first insulation barrier 30, 34, 38 at a distance, for example, 1 cm to 2 cm, the insulation barrier substantially including a thin, for example, 1 mm to 3 mm thick and hardened layer of an insulation material composed of, for example, cellulose. Insulation barriers of this type are usually produced as shaped parts in a specific method. The first insulation barrier 30, 34, 38 follows the outer contour of the conductive element 12, 14 and therefore likewise has a cylindrical 38 and hemispherical 34 region. Moreover, a radially aligned pipe attachment connector 30 of the first insulation barrier is provided in the region of the connection element 22, 24 in order also to construct an insulation barrier around the screening pipe 26. The spacing-apart between conductive element and first insulation barrier is effected by flexible insulation strips.

A dimensionally similar second insulation barrier 32, 36, 40 is arranged around the first insulation barrier 30, 34, 38 at a further distance. The second insulation barrier correspondingly again having a hollow-cylindrical 40 and hemispherical 36 region with a pipe attachment connector 32. The first 30, 34, 38 insulation barrier is spaced apart from the second 32, 36, 40 by insulating rings 42, 44, 46 composed of, for example, pressboard. The radially inner and outer form of the insulating rings is adapted to the respective radii in the cylindrical region 38, 40 and to the respective spheres in the hemispherical region 34, 36 in order thus to enable an optimum areal mechanical contact-connection to the adjoining insulation barriers. A corrugation of the insulation rings 42, 44, 46 is present.

Figure 2:
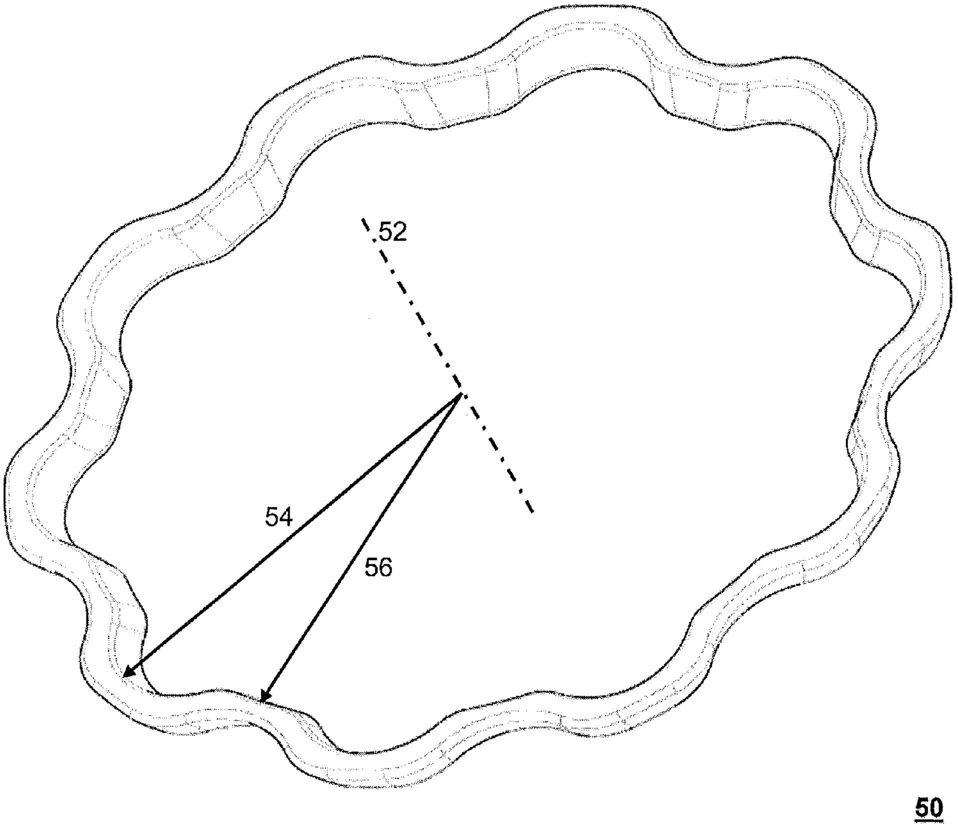
FIG. 2 shows an exemplary embodiment of an insulation ring for the region of a hemispherical form.

FIG. 2 shows an exemplary insulation ring 50 having a spherically adapted outer form. This insulation ring can be arranged approximately rotationally symmetrically about a rotational axis 52, which, in the installed state, runs approximately together with the first rotational axis of the spherical cap. However, it can be advantageous to position the rotational axis 52 somewhat obliquely with respect to the first rotational axis, for example, proportionally to an oblique orientation of a pipe attachment connector, which is, for example, in an angular range of, for example, between about 0° and 30° with respect to the first rotational axis. In order to achieve an improved insulation capability between first and second insulation barriers, a corrugation of the insulation ring can be provided, which is distinguished by different radii 54, 56 of the insulation ring. Because as mentioned in the introduction, oil has a lower permittivity than pressboard, for example, from which such insulation rings can be manufactured, it is expedient to provide a minimum corrugation with respect to the thickness of the corrugated insulation material, for example, a thickness of 1 cm and a corrugation of +/−0.5 cm or +/−1 cm. An increase corrugation would further reduce the displacement of the electric field into the adjacent oil channels but encounters mechanical limits at least in the case of pressboard.

Figure 3:
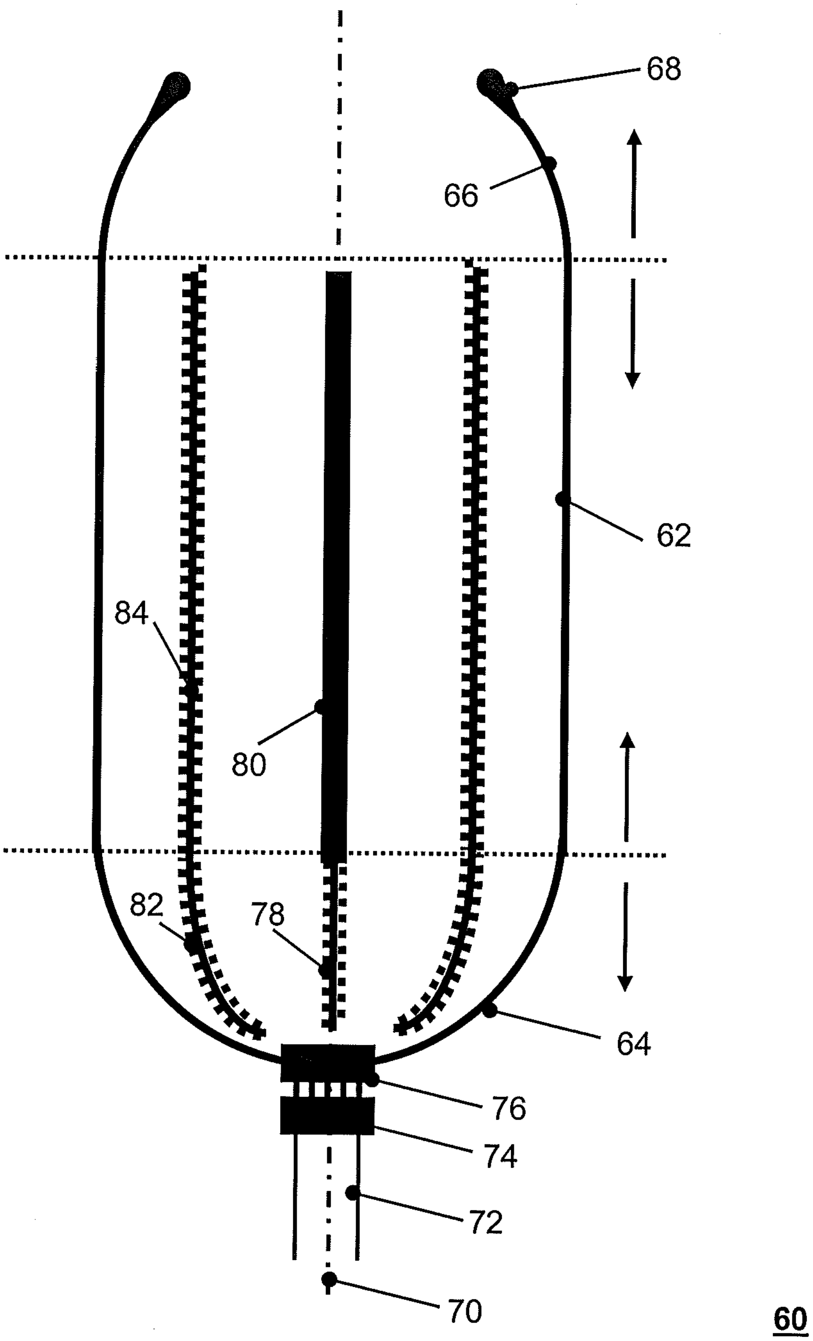
FIG. 3 shows an exemplary embodiment of a second conductive element with insulation strips.

FIG. 3 shows an exemplary embodiment of a conductive element according to the disclosure with insulation strips in a combined side/sectional view 60. A conductive element 62, 64, 66, 68 is constructed rotationally symmetrically about a rotational axis 70 and has a cylindrical region 62 and an axially adjoining hemispherical region 64. At the second axial end of the cylindrical region 62, the latter merges into a tapered hemispherical-section-shaped region 66, which, at its outermost axial second end, can be welded to a torus-like electrode having a drop-like cross section 68. At the outermost first axial end of the conductive element, a bipartite electrical and also mechanical connection device 74, 76 is provided, which is connected by its first part 74 to a screening pipe 72. A plurality of strips 78, 80, 82, 84, are arranged along the rotational axis 70 on that surface of the conductive element which lies radially on the outside, the strips having in part a rigid 80 or else flexible 78, 82, 84 regions. In the case of the latter, these are indicated by corresponding slots. An additional insulation layer can be provided radially between the outer area of the conductive element 62, 64, 66, 68 and the flexible strips.

Figure 4:
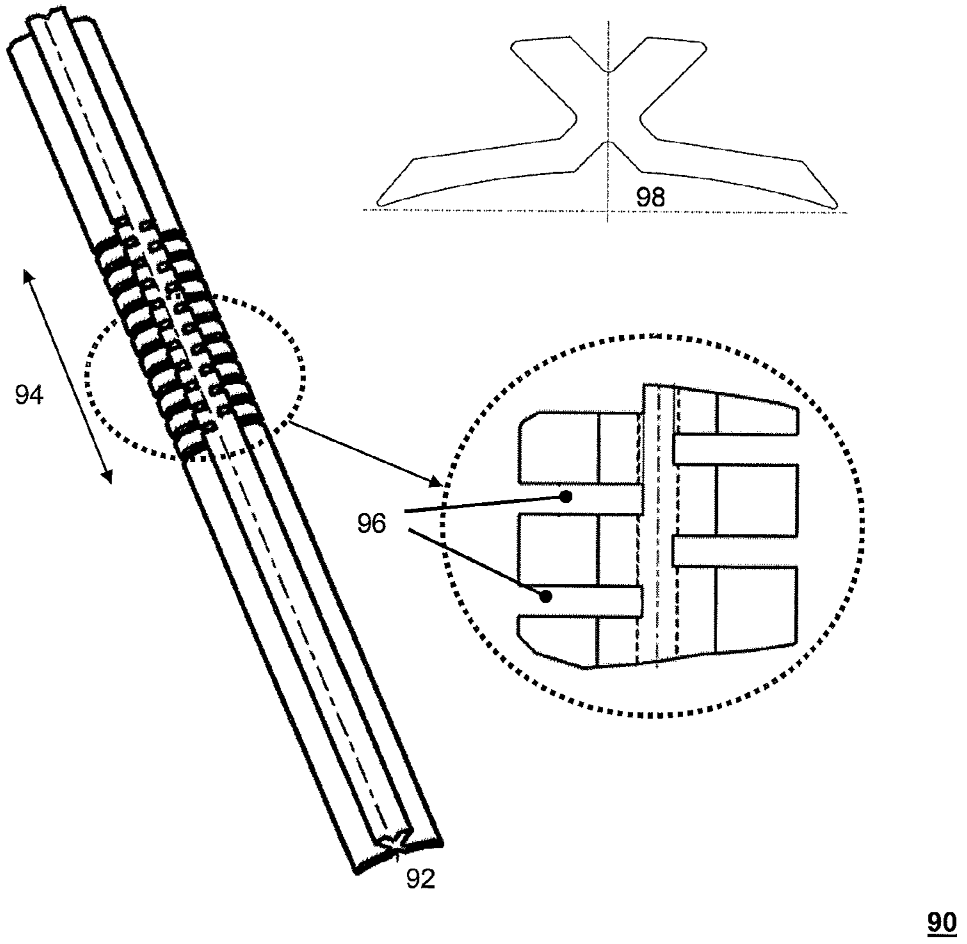
FIG. 4 shows an exemplary embodiment of a flexible strip in different views.

FIG. 4 shows a flexible x-strip 90 in different views 92, 98. A flexible region 94 is illustrated in an enlarged view in a detail drawing, which also illustrates slots 96. It can readily be seen in the cross-sectional illustration 98 that the respective bearing areas follow a radius corresponding to that of cylindrical components that are respectively to be spaced apart.

Figure 5:
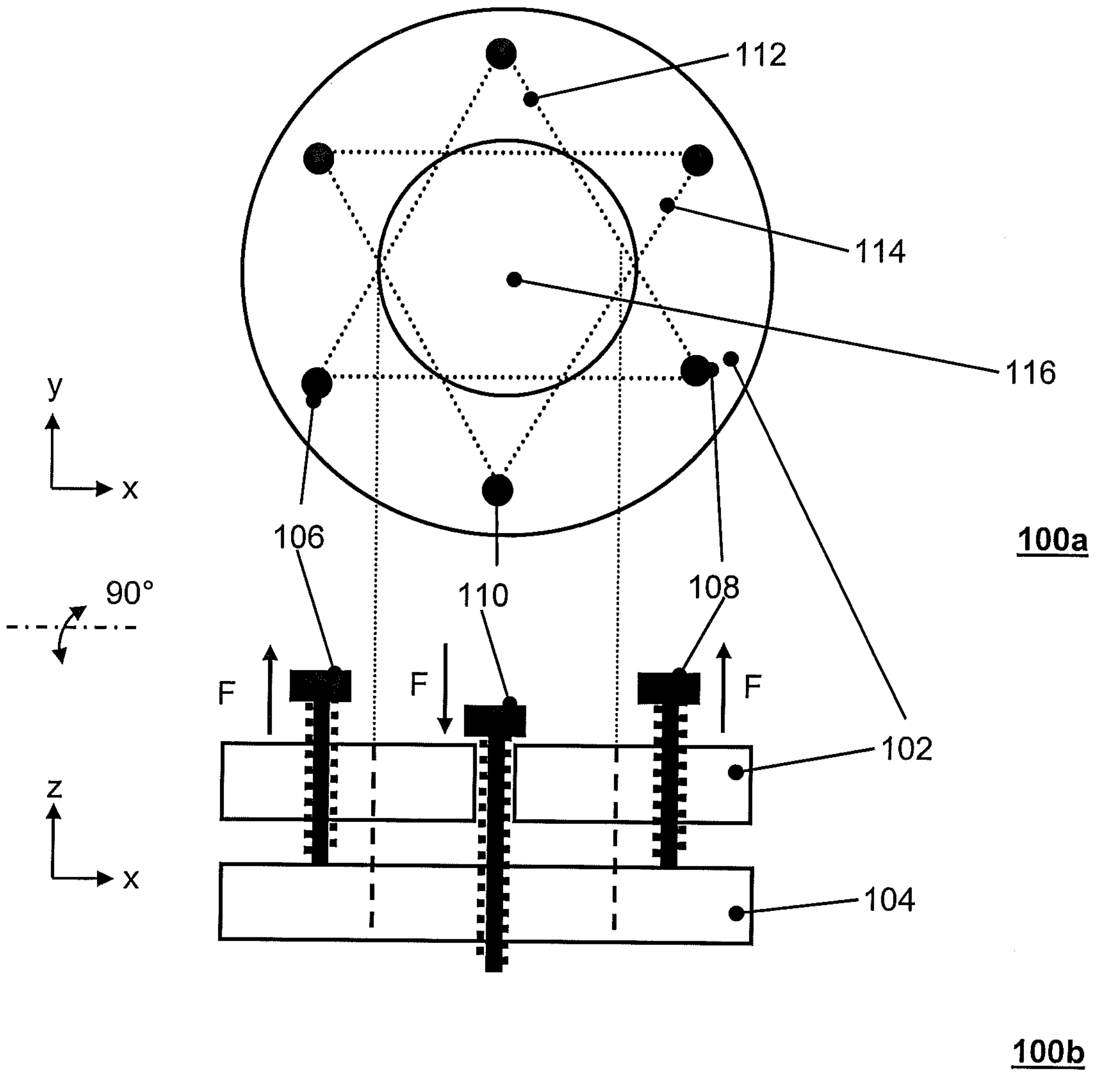
FIG. 5 shows an exemplary embodiment of a connection device in plan view and sectional view.

FIG. 5 shows a third connection device in a plan view 100*a* and a sectional view 100*b* tilted at 90° with respect thereto. The connection device has a disk-like, hollow-cylindrical first part 104, which is provided for being electrically and mechanically connected to a screening pipe. Arranged axially adjacent there is a second part 102 having a similar form, which is provided for being connected to a conductive element, for example, by a welding connection in the hemispherical region thereof. A first group of three screw connections 106, 108 oriented parallel to one another and perpendicular to the two disk-like parts of the connection device is arranged at the corner points of an imaginary equilateral first triangle 112 on the top side of the second disk-like part 102. A second group of three screw connections 110 oriented parallel thereto is arranged at the corner points of a second imaginary equilateral triangle, wherein all the screw connections are arranged equidistantly along a respectively common, in this case identical, circle. The circle encloses the hollow-cylindrical interior of the two parts 102, 104 of the connection device.

The screw connections 106, 108 of the first group are designed to exert a compressive force between the two adjacent parts 102, 104 of the connection device, as indicated by an arrow and the symbol F (=Force). Respective screws are led through a threaded passage hole in the second part 102 and space the latter apart at a minimum distance, depending on the turned position of the respective screw in the thread course. The screw connections 110 of the second group are designed to exert a tensile force between the two parts 102, 104 and space the latter apart at a maximum distance. In this case, a respective screw is led through a threadless passage hole in the second part 102 and leads into a thread course adapted thereto in the first part 104. Both types of screw connections 106, 108, 110 are thus freely movable in one direction of movement and limiting in the opposite direction. The connection device is locked precisely when the respective screw connections apply a respectively opposite locking force.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Section through a first exemplary spherical cap
12 Cylindrical region of first conductive element
14 Hemispherical region of first conductive element
16 First axial end of the cylindrical region
18 Second axial end of the cylindrical region
20 Rotational axis
22 First part of first connection device
24 Second part of first connection device
25 Passage Opening
26 Screening pipe
28 High-voltage conductor
30 Pipe attachment connector of first insulation barrier
32 Pipe attachment connector of second insulation barrier
34 Hemispherical region of first insulation barrier
36 Hemispherical region of second insulation barrier
38 Cylindrical region of first insulation barrier
40 Cylindrical region of second insulation barrier
42 First insulation ring between first and second insulation barriers
44 Second insulation ring between first and second insulation barriers
46 Third insulation ring between first and second insulation barriers
50 Exemplary insulation ring for region of hemispherical form
52 Rotational axis
54 Internal radius in the region of a corrugation tip
56 Internal radius in the region of a corrugation recess

What is claimed is:

1. A spherical cap for a high-voltage outgoing line, comprising:

an electrically conductive element, which is arranged as a hollow-cylinder about a rotational axis that merges into a hemispherical form at its first axial end;

a connection device having a passage opening for electrically and mechanically connecting the element to an electrical screening pipe;

at least two insulation barriers spaced apart from one another, and respectively adapted to a form of the hollow-cylindrical element, for enclosing the hollow cylindrical element at respective first and second distances, the insulation barriers respectively having a pipe attachment connector for attaching the screening pipe to the connection device, wherein the connection device includes a first part for connection to the screening pipe, and a second part connected to the conductive element, wherein a connection, adjustable in a force-locking manner, is provided between the first and second parts;

wherein the connection adjustable in a force-locking manner comprises:

two groups of, in each case, three parallel aligned screw connections arranged in triangles respectively offset relative to one another, wherein a first group is provided for applying a tensile force between the two parts, and a second group for applying a compressive force between the two parts.

2. The spherical cap according to claim 1, wherein the screw connections of at least one of the groups are arranged equidistantly along a common circular path around the passage opening of the connection device.

3. The spherical cap according to claim 1, wherein all the screw connections of the two groups are accessible through the second axial end of the conductive element.

4. The spherical cap according to claim 1, wherein the second part of the connection device is milled and welded into the conductive element.

5. The spherical cap according to claim 1, comprising:

a torus-like milled electrode having a drop-like cross section widening towards the axial end welded onto a tapering second axial end of the conductive element.

6. The spherical cap according to claim 1, wherein the conductive element, at least one part of the connection device, and/or the electrode are produced from aluminium.

7. The spherical cap according to claim 1, wherein the connection device, is connected to the conductive element in a region of the hemispherical first axial end thereof, and the screening pipe is led through the passage opening of the connection device and through an opening adjacent in a wall of the conductive element into an interior thereof.

8. The spherical cap according to claim 1, comprising:

at least one insulation ring for spacing the first insulation barrier apart from the second insulation barrier, the at least one insulation ring being arranged about the rotational axis and having a radially fashioned corrugated form.

9. The spherical cap according to claim 8, wherein the least one insulation ring, in a region of the hemispherical form of the conductive element, is adapted radially on an inside and radially on an outside to the enclosing hemispherical forms of the respectively adjoining insulation barriers.

10. The spherical cap according to claim 9, wherein the conductive element is tapered as a hemispherical section at its second axial end.

11. The spherical cap according to claim 8, wherein the at least one insulation ring has a flattened corrugated form.

12. The spherical cap according to claim 1, comprising:

insulation strips for spacing apart the first insulation barrier from the electrically conductive element, wherein the insulation strips are flexible at least in sections.

13. The spherical cap according to claim 12, wherein the strips comprise:

an angled profile; and a plurality of slots arranged transversely relative to their respective axial extent at least in a flexible section.

14. The spherical cap according to claim 13, wherein the angled profile of a flexible strip is embodied as an X-, V- and/or Y-profile.

15. The spherical cap according to claim 1, wherein the pipe attachment connector of at least one of the first and second insulation barriers is integrally formed directly onto the at least one of the first and second insulation barriers, such that a seam is avoided.

16. The spherical cap according to claim 1, wherein all the screw connections of the two groups are accessible through the second axial end of the conductive element.

17. The spherical cap according to claim 1, comprising:

at least one insulation ring for spacing the first insulation barrier apart from the second insulation barrier, the at least one insulation ring being arranged about the rotational axis and having a radially fashioned corrugated form.

18. The spherical cap according to claim 17, wherein the least one insulation ring, in a region of the hemispherical form of the conductive element, is adapted radially on an inside and radially on an outside to the enclosing hemispherical forms of the respectively adjoining insulation barriers.

19. The spherical cap according to claim 18, wherein the conductive element is tapered as a hemispherical section at its second axial end.

* * * * *